United States Patent
Chen et al.

(10) Patent No.: US 10,515,166 B2
(45) Date of Patent: Dec. 24, 2019

(54) METHOD OF TIMING ANALYSIS

(71) Applicant: TAIWAN SEMICONDUCTOR MANUFACTURING COMPANY LTD., Hsinchu (TW)

(72) Inventors: Yen-Pin Chen, Taipei (TW); Tai-Yu Cheng, Pingtung (TW); Tzu-Hen Lin, Hsinchu (TW); Chung-Hsing Wang, Hsinchu County (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 80 days.

(21) Appl. No.: 15/874,450

(22) Filed: Jan. 18, 2018

(65) Prior Publication Data
US 2018/0232474 A1 Aug. 16, 2018

Related U.S. Application Data

(60) Provisional application No. 62/459,211, filed on Feb. 15, 2017.

(51) Int. Cl.
*G06F 17/50* (2006.01)

(52) U.S. Cl.
CPC ........ *G06F 17/5031* (2013.01); *G06F 17/505* (2013.01); *G06F 2217/02* (2013.01); *G06F 2217/84* (2013.01)

(58) Field of Classification Search
CPC .............. G06F 17/5031; G06F 17/505; G06F 2217/02; G06F 2217/84; G06F 17/50
See application file for complete search history.

(56) References Cited

U.S. PATENT DOCUMENTS

| | | | |
|---|---|---|---|
| 2016/0161968 A1* | 6/2016 | Kim | ........................ H01L 25/18 365/226 |
| 2018/0060471 A1* | 3/2018 | Foreman | ............. G06F 17/5031 |
| 2018/0239860 A1* | 8/2018 | Allen | .................. G06F 17/5022 |

* cited by examiner

*Primary Examiner* — Vuthe Siek
(74) *Attorney, Agent, or Firm* — WPAT, P.C., Intellectual Property Attorneys; Anthony King

(57) ABSTRACT

A method includes identifying the first path as a target path, wherein an operation speed of the target path is adjusted from the corner case; deriving and outputting first values from the lookup table by indexing the lookup table with a threshold voltage associated with the first path identified as the target path as the main threshold voltage and a threshold voltage associated with the second path as the slave threshold voltage; calculating a first extra time based on the first values and first cell delays associated with the first path.

20 Claims, 17 Drawing Sheets

| | slave threshold voltage | |
|---|---|---|
| main threshold voltage | Vt1 | Vt3 |
| Vt1 | 0 | VA1 |
| Vt3 | VA3 | 0 |

30

| main threshold voltage | slave threshold voltage | |
| --- | --- | --- |
|  | Vt1 | Vt3 |
| Vt1 | 0 | VA1 |
| Vt3 | VA3 | 0 |

| main threshold voltage | slave threshold voltage | | |
|---|---|---|---|
| | Vt1 | Vt2 | Vt3 |
| Vt1 | 0 | VA1 | VA10 |
| Vt2 | VA2 | 0 | VA20 |
| Vt3 | VA3 | VA30 | 0 |

```
┌─────────────────────────────────────────────────────────┐
│ preparing a netlist of a digital circuit describing a timing path │
│ including a first path and a second path, the first path │
│ including a first cell having a first threshold voltage, and a │
│ second cell having a second threshold voltage different from │──700
│ the first threshold voltage, the second path including a third │
│ cell having a third threshold voltage, and a fourth cell having │
│ the third threshold voltage different from the first threshold │
│ voltage and the second threshold voltage │
└─────────────────────────────────────────────────────────┘
                              ↓
┌─────────────────────────────────────────────────────────┐
│ preparing a lookup table describing values for adjusting │──104
│ operation speed of a cell │
└─────────────────────────────────────────────────────────┘
                              ↓
┌─────────────────────────────────────────────────────────┐
│ identifying the first path as a target path │──106
└─────────────────────────────────────────────────────────┘
                              ↓
┌─────────────────────────────────────────────────────────┐
│ retrieving and outputting a first value by indexing the lookup │
│ table with the first threshold voltage as the main threshold │──702
│ voltage and the third threshold voltage as │
│ the slave threshold voltage │
└─────────────────────────────────────────────────────────┘
                              ↓
┌─────────────────────────────────────────────────────────┐
│ retrieving and outputting a second value by indexing the │
│ lookup table with the second threshold voltage as the main │──704
│ threshold voltage and the third threshold voltage as the slave │
│ threshold voltage │
└─────────────────────────────────────────────────────────┘
                              ↓
┌─────────────────────────────────────────────────────────┐
│ calculating a first extra time based on the first value, the first │──706
│ cell delay, the second value and the second cell delay │
└─────────────────────────────────────────────────────────┘
                              ↓
┌─────────────────────────────────────────────────────────┐
│ identifying the second path as the target path │──112
└─────────────────────────────────────────────────────────┘
                              ↓
┌─────────────────────────────────────────────────────────┐
│ retrieving and outputting a third value by indexing the lookup │
│ table with the third threshold voltage as the main threshold │──708
│ voltage and one of the first threshold voltage and the second │
│ threshold voltage as the slave threshold │
└─────────────────────────────────────────────────────────┘
                              ↓
┌─────────────────────────────────────────────────────────┐
│ calculating a second extra time based on the third value, the │──710
│ third cell delay and the fourth cell delay │
└─────────────────────────────────────────────────────────┘
```

| Combinations | Vt1 | Vt2 | Vt4 |
|---|---|---|---|
| 1 | 0 | 0 | 0 |
| 2 | VC1 | 0 | 0 |
| 3 | 0 | VC2 | 0 |
| 4 | 0 | 0 | VC3 |
| 5 | VC1 | VC2 | 0 |
| 6 | VC1 | 0 | VC3 |
| 7 | 0 | VC2 | VC3 |

```
┌─────────────────────────────────────────────────────┐
│ preparing a netlist of a digital circuit describing a timing path │
│   including a first path and a second path, the first path        │
│   including a first cell having a first threshold voltage, and a  │
│ second cell having a second threshold voltage different from      │──── 122
│  the first threshold voltage, the second path including a third   │
│    cell having the second threshold voltage, and a fourth cell    │
│    having a third threshold voltage different from the first      │
│         threshold voltage and the second threshold voltage        │
└─────────────────────────────────────────────────────┘
                              │
                              ▼
┌─────────────────────────────────────────────────────┐
│   preparing a lookup table, values described in the lookup table  │
│  being derived based on a corner case at which a timing analysis  │
│      is performed, the lookup table including a plurality of      │
│    combinations, each of the combinations describes a first       │
│   value for adjusting an operation speed of a cell having the first│
│   threshold voltage, a second value for adjusting an operation    │──── 900
│  speed of a cell having the second threshold voltage and a third  │
│  value for adjusting an operation speed of a cell having the third│
│  threshold voltage, wherein one of the first value, the second    │
│     value and the third value is zero, and wherein each of the    │
│             combinations is different from others                 │
└─────────────────────────────────────────────────────┘
                              │
                              ▼
┌─────────────────────────────────────────────────────┐
│    calculating a plurality of extra time for the combinations,    │
│      wherein for each of the combinations each of the extra       │
│   times is calculated based on the first cell delay, the first value,│──── 902
│     the second cell delay, the second value, the third cell delay,│
│            the third value, and the fourth cell delay             │
└─────────────────────────────────────────────────────┘
                              │
                              ▼
┌─────────────────────────────────────────────────────┐
│        selecting a maximum extra time and a minimum               │──── 904
│                  extra time from the extra times                  │
└─────────────────────────────────────────────────────┘
```

FIG. 16

METHOD OF TIMING ANALYSIS

PRIORITY CLAIM AND CROSS-REFERENCE

This application claims the benefit of provisional application Ser. 62/459,211 filed on Feb. 15, 2017, entitled "METHOD OF DESIGNING CIRCUITS" the disclosure of which is hereby incorporated by reference in its entirety.

BACKGROUND

In order to simplify design complexity of a digital circuit, a user can use a digital circuit design program and a library model built therein to design a required digital circuit. Further, the user may perform circuit function verification on the digital circuit design, so as to determine whether the digital circuit design can successfully satisfy the user's functional requirements.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3 is a diagram of a lookup table in accordance with some embodiments of the present disclosure.

FIG. 8 is a diagram of a lookup table in accordance with some embodiments of the present disclosure.

FIG. 11 is a flow diagram of another method of timing analysis, in accordance with some embodiments of the present disclosure.

FIG. 15 is a diagram of a lookup table, in accordance with some embodiments of the present disclosure.

FIG. 16 is a flow diagram of still another method of timing analysis, in accordance with some embodiments of the present disclosure.

Figure 1:
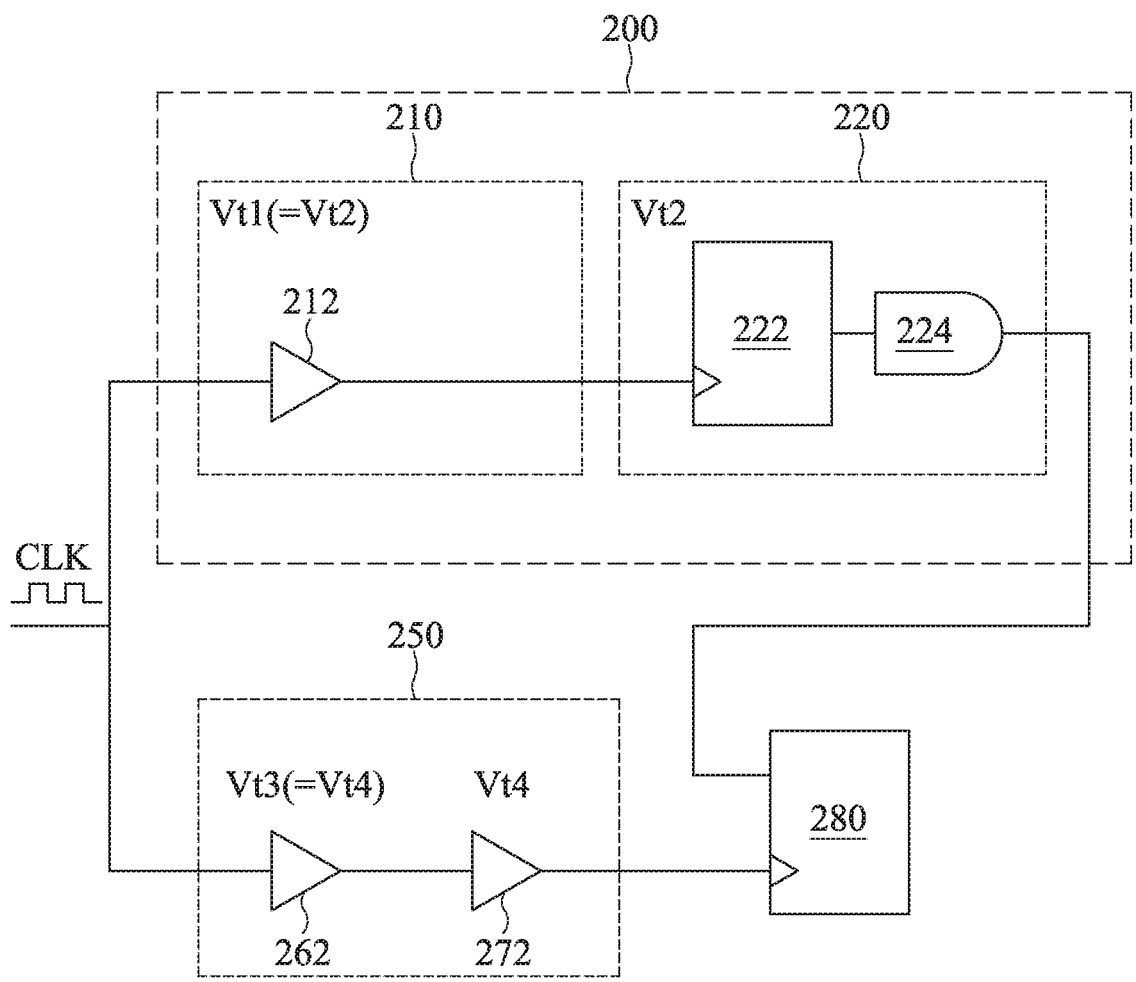
FIG. 1 is a circuit diagram of a digital circuit described in a netlist, in accordance with some embodiments of the present disclosure.

The various features disclosed in the drawings briefly described above will become more apparent to one of ordinary skill in the art upon reading the detailed description below. Where features depicted in the various figures are common between two or more figures, the same identifying numerals have been used for clarity of description.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, especially relative terms, such as "beneath," "below," "lower," "above," "upper" and the like, may be used herein for eases of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a circuit diagram of a digital circuit 20 described in a netlist, in accordance with some embodiments of the present disclosure. Referring to FIG. 1, the digital circuit 20 includes a timing path including a first path 200, and a second path 250 including a capture clock path. The first path 200 and the second path 250 are controlled by a same clock signal CLK while do not overlap with each other. The digital circuit 20 further includes a second gate 280. In an embodiment, the second gate 280 includes a flip flop.

The first path 200 includes a launch clock path 210 including a first cell 212, and a data path 220 including a first gate 222 and a combinational logic 224. The launch clock path 210, in an embodiment, starts at a clock input port of the digital circuit 20 and ends at a clock pin of the first gate 222. The data path 220, in an embodiment, starts at the clock pin of the first gate 222 and ends at a data input port of the second gate 280.

The first cell 212 functions to transfer the clock signal CLK to the first gate 222. Moreover, the first cell 212 has a first threshold voltage Vt1. In an embodiment, the first cell 212 includes a buffer functioning to increase strength of the clock signal CLK transmitted on the first path 200. The first cell 212 may include other devices, while threshold voltage of such devices equals the first threshold voltage Vt1.

The first gate 222 can be deemed as a cell, and the combinational logic 224 can also be deemed as a cell. The first gate 222 functions to receive the clock signal CLK, and lunch data. The combinational logic 224 functions to transfer the data. For convenience of discussion, the first gate 222 is deemed as a second cell, and the second cell is labeled 222. In that case, the combinational logic 224 will be ignored in the following discussion. However, the present disclosure is not limited thereto. In another embodiment, the combinational logic 224 is deemed as a second cell. In that case, the second cell will be labeled 224, and the first gate 222 will be ignored in the following discussion. The second cell 222 has a second threshold voltage Vt2 equal to the first threshold voltage Vt1. In an embodiment, the first gate 222 includes a flip flop.

The second path 250 includes a third cell 262 and a fourth cell 272. The third cell 262 and the fourth cell 272 functions to transfer to the clock signal CLK to the second gate 280. The second gate 280 functions to receive the clock signal CLK, and capture the data transferred by the combinational logic 224. The third cell 262 has a third threshold voltage Vt3. In an embodiment, the third cell 262 includes a buffer functioning to increase strength of the clock signal CLK transmitted on the second gate 280. The third cell 262 may include other devices, while such devices also have the third threshold voltage Vt3. The fourth cell 272 has a fourth threshold voltage Vt4 equal to the third threshold voltage Vt3.

The first cell 212 having the first threshold voltage Vt1 may be different in operation speed from the third cell 232 having the third threshold voltage Vt3. For example, the operation speed of the first cell 212 is an SS corner case of Vt1 while the operation speed of the third cell 262 is faster than an SS corner case of Vt3. Alternatively, the operation speed of the third cell 262 is an SS corner case of Vt3 while the operation speed of the first cell 212 is faster than an SS corner case of Vt1. In the present disclosure, when performing a simulation of timing analysis, two different operation speeds are considered for both the first path 200 and the second path, which will be described in detail. Therefore, the simulation result can cover relatively broader circumstances. Contrarily, in some existing approaches, only a single operation speed is considered for both the first path 200 and the second path. In further detail, when performing a simulation, both a first path analogous to the first path 200 of the present disclosure and a second path analogous to the second path of the present disclosure are set at Vt1's and Vt3's SS corner case, respectively. Therefore, the existing approaches can only cover relatively narrower circumstances, and therefore relatively optimistic.

Figure 2:
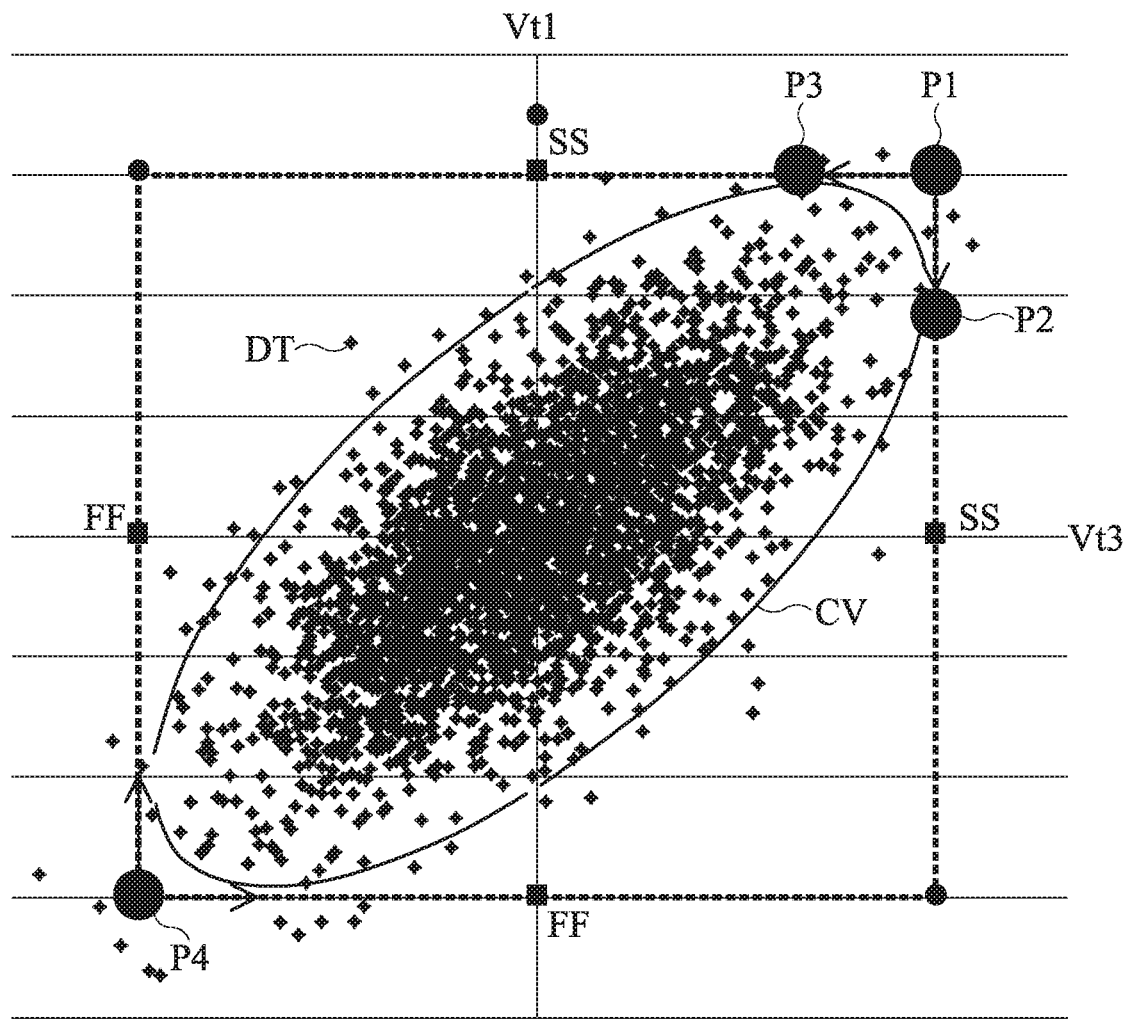
FIG. 2 is a plot diagram illustrating the correlation in corner cases between threshold voltages, in accordance with some embodiments of the present disclosure.

FIG. 2 is a plot diagram illustrating the correlation in corner cases between threshold voltages, in accordance with some embodiments of the present disclosure. Referring to FIG. 2, a horizontal axis represents variation, in corner case, associated with the third threshold voltage Vt3, ranging from a Fast-Fast (FF) corner case to a Slow-Slow (SS) corner case. A vertical axis represents variation, in corner case, associated with the first threshold voltage Vt1, ranging from the FF corner case to the SS corner case. Each dot dt represents the relation between the first threshold voltage Vt1 and the third threshold voltage Vt3. Most of the dots dt are within a region CV. As such, if a simulation of timing analysis is performed under the circumstance of a dot P1 (at which the operation speed of both a first cell having the first threshold voltage Vt1 and a second cell having the third threshold voltage Vt3 are at an SS corner case), the simulation result is not able to reflect and cover the relatively broad circumstances, and therefore may be relatively optimistic. To get closer to the region defined CV, an operation speed of the first cell having the first threshold voltage Vt1 should be increased from the corner case SS, such that the dot P1 shifts to a dot P2. Alternatively, an operation speed of the second cell having the third threshold voltage Vt3 should be increased from the corner case SS, such that the dot P1 shifts to a dot P3.

Additionally, if a simulation of timing analysis is performed under a circumstance of a dot P4 (at which the operation speed of both a first cell having the first threshold voltage Vt1 and a second cell having the third threshold voltage Vt3 are at an FF corner case), to get closer to the region CV, an operation speed of the first cell having the first threshold voltage Vt1 should be decreased from the FF corner case. Alternatively, an operation speed of the second cell having the third threshold voltage Vt3 should be decreased from the FF corner case.

FIG. 3 is a diagram of a lookup table 30 in accordance with some embodiments of the present disclosure. Referring to FIG. 3, in the lookup table 30 the leftmost column represents a main threshold voltage, and the uppermost row represents a slave threshold voltage. The lookup table 30 provides values VA1 and VA3 for adjusting the operation speed of a cell, which will be described in detail with reference to FIGS. 4 and 5. The values VA1 and VA3 are derived based on a corner case at which a timing analysis is performed. For example, when, referring back to FIG. 2, a timing analysis is performed at an SS corner case, values VA1 and VA3 of the lookup table 30 are derived based on the SS corner case and therefore the values VA1 and VA3 are used for increasing the operation speed of a cell. Alternatively, when, referring back to FIG. 2, a timing analysis is performed at an FF corner case, values VA1 and VA3 of the lookup table 30 are derived based on the FF corner case and therefore the values VA1 and VA3 are used for decreasing the operation speed of a cell. For convenience of discussion, in the following discussion it is assumed that the values VA1 and VA3 are derived based on an SS corner case.

In operation, a first value such as VA1 is retrieved and output by indexing the lookup table 30 with the first threshold voltage Vt1 as the main threshold voltage and the third threshold voltage Vt3 as the slave threshold voltage. In an embodiment, the first value is about 6%. Similarly, a second value Va3 is retrieved and output by indexing the lookup table 30 with the third threshold voltage Vt3 as the main threshold voltage and the first threshold voltage Vt1 as the slave threshold voltage. In an embodiment, the third value VA3 is about 8%.

Figure 4:
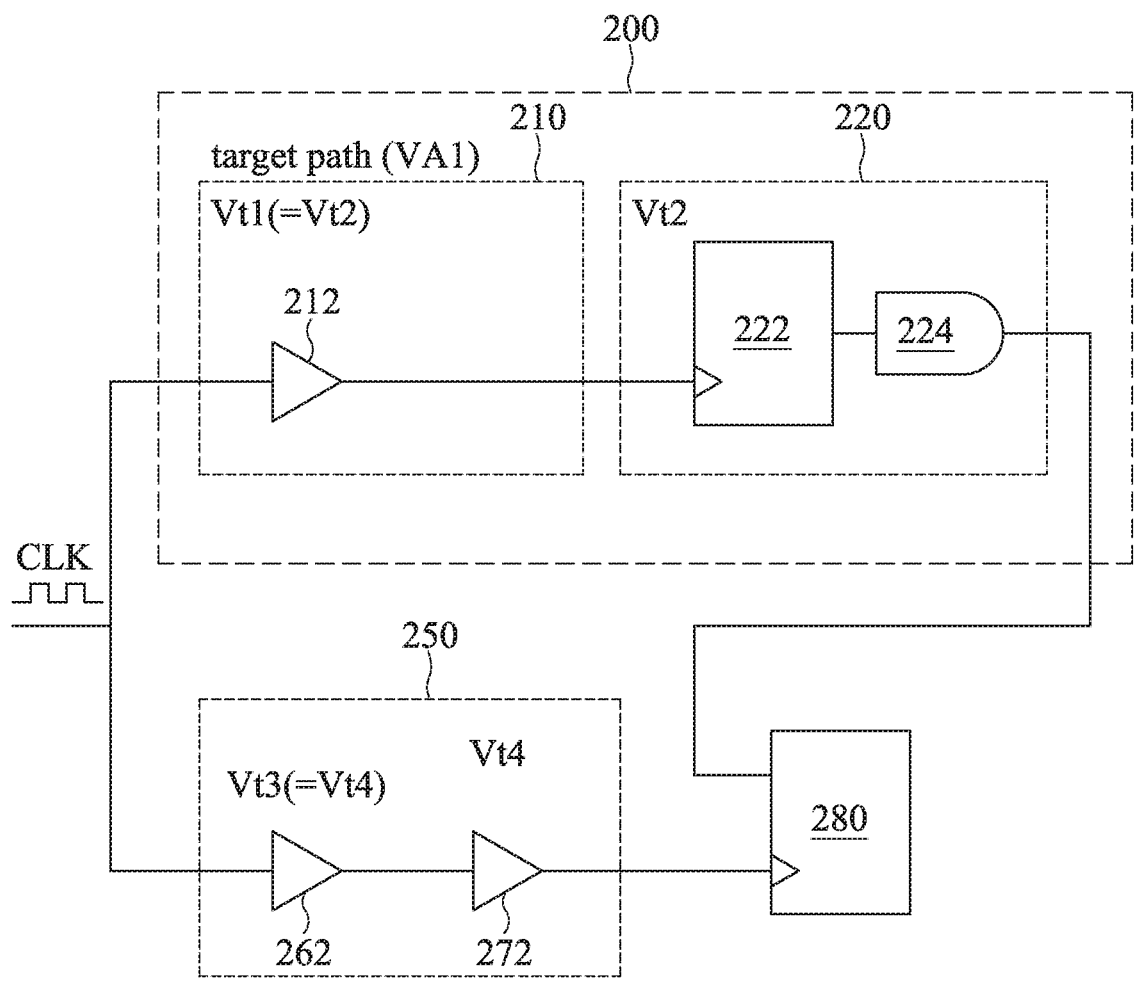
FIG. 4 is a diagram illustrating timing analysis on the digital circuit shown in FIG. 1, in accordance with some embodiments of the present disclosure.

FIG. 4 is a diagram illustrating a timing analysis on the digital circuit 20 shown in FIG. 2, in accordance with some embodiments of the present disclosure. The first path 200 and the second path 250 are in turn identified as a target path. An operation speed of the target path should be adjusted from a corner case at which a timing analysis is performed. As such, cells in the target path are therefore adjusted from the corner case.

Referring to FIG. 4, the first path 200 is identified as a target path. As a result, operation speeds of the first cell 212 and the second cell 222 in the first path 200 are adjusted. The value VA1 is retrieved and output by indexing the lookup table 30 with the first threshold voltage Vt1 of the first cell 212 as the main threshold voltage and the third threshold voltage Vt3 of the third cell 262 (or, of the fourth cell 272) as the slave threshold voltage. Also, the value VA1 is retrieved and output by indexing the lookup table 30 with the first threshold voltage Vt1 of the second cell 222 as the main threshold voltage and the third threshold voltage Vt3 of the third cell 262 as the slave threshold voltage.

A first extra time is calculated based on the value VA1, a first cell delay, and a second cell delay. For convenience of discussion, in the following context it is assumed that the first cell delay associated with the first cell 212 is approximately 100 picoseconds (ps); and the second cell delay associated with the second cell 222 is approximately 50 ps. Moreover, as previously mentioned, the value VA1 is 6%. The first extra time can be obtained as follows.

The first extra time=100 ps×6%+50 ps×6%=9 ps.

In a circumstance that a timing analysis is performed at an SS corner case for both the first path 200 and the second path 250, an original delay time of the first path 200 is obtained by summing the first cell delay of 50 ps and the second cell delay of 100 ps, and is therefore 150 ps. By using the approach of the present disclosure, an equivalent delay time of the first path 200 is obtained by subtracting the first extra time of 9 ps from the original delay time of 150 ps, and is therefore 141 ps. In an embodiment, the first extra time is the product of cell delays and corresponding values of the lookup table.

Figure 5:
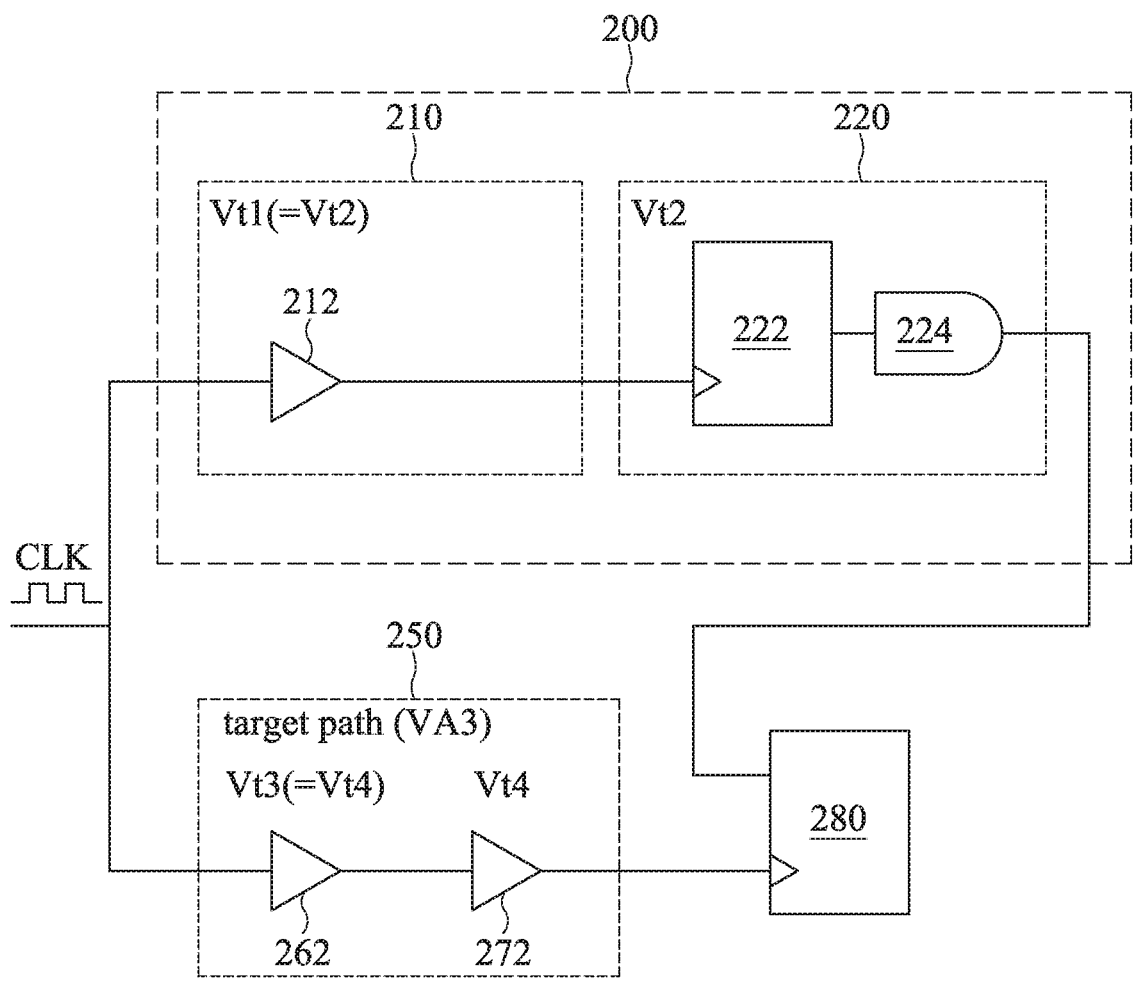
FIG. 5 is a flow diagram of a method of timing analysis, in accordance with some embodiments of the present disclosure.

FIG. 5 is a diagram illustrating a timing analysis on the digital circuit 20 shown in FIG. 2, in accordance with some embodiments of the present disclosure. Referring to FIG. 5, the second path 250 is identified as the target path. As a result, operation speeds of the third cell 262 and the fourth cell 272 in the second path 250 are adjusted. The value VA3 is retrieved and output by indexing the lookup table 30 with the third threshold voltage Vt3 of the third cell 262 as the main threshold voltage and the first threshold voltage Vt1 of the first cell 212 (, or the second cell 222) as the slave threshold voltage. Also, the value VA3 is retrieved and output by indexing the lookup table 30 with the third threshold voltage Vt3 of the fourth cell 272 as the main threshold voltage and the first threshold voltage Vt1 of the first cell 212 (, or the second cell 222) as the slave threshold voltage.

A second extra time is calculated based on the value VA3, a third cell delay, and a fourth cell delay. In an embodiment, the third cell delay is 100 ps, the fourth cell delay is 50 ps, and the value va3 is 8%. The second extra time can be obtained as follows.

The second extra time=100 ps×8%+50 ps×8%=12 ps.

In a circumstance that a timing analysis is performed at an SS corner case for both the first path 200 and the second path 250, an original delay time of the second path 250 is obtained by summing the first cell delay of 50 ps and the second cell delay of 100 ps, and therefore is 150 ps. By using the approach of the present disclosure, an equivalent delay time of the second path 250 is obtained by subtracting the second extra time of 12 ps from the original delay time of 150 ps, and is therefore 138 ps.

Figure 6:
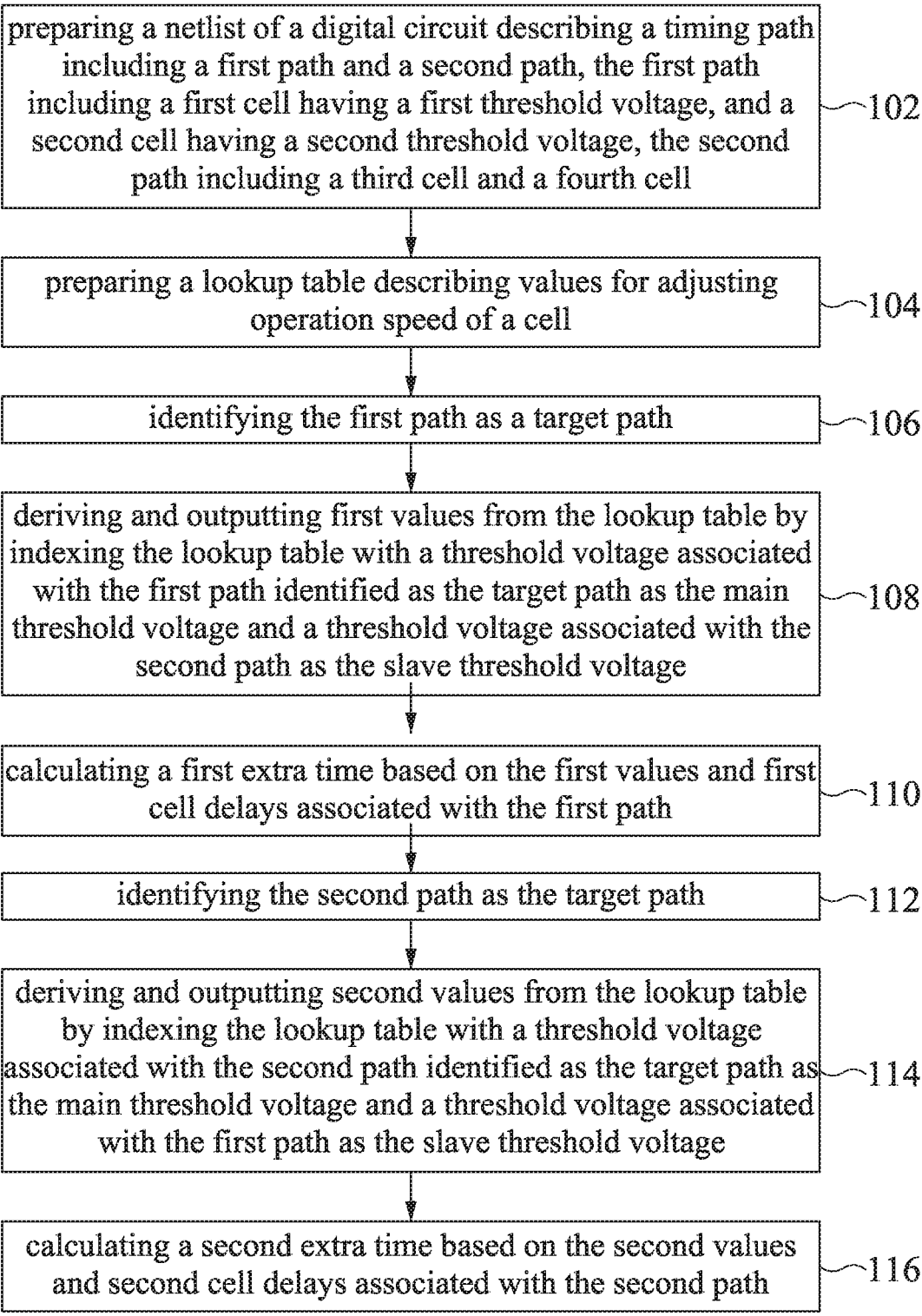
FIG. 6 is a flow diagram of a method of timing analysis, in accordance with some embodiments of the present disclosure.

FIG. 6 is a flow diagram of a method 10 of a timing analysis, in accordance with some embodiments of the present disclosure. Referring to FIG. 6, the method 10 begins with operation 102, in which a netlist of a digital circuit describing a timing path is prepared. The timing path includes a first path and a second path, which are controlled by a same clock signal while do not overlap with each other. The first path includes a launch clock path and a data path, and the second path includes a capture clock path. The first path includes a first cell having a first threshold voltage, and a second cell having a second threshold voltage equal to the first threshold voltage. The second path includes a third cell and a fourth cell.

In operation 104, a lookup table providing values for adjusting an operation speed of a cell is prepared. In further detail, the values are derived based on a corner case at which a timing analysis is performed. For example, when a timing analysis is performed at an SS corner case, values described in a lookup table are derived based on the SS corner case and therefore the values are used for increasing the operation speed of a cell. Alternatively, when a timing analysis is performed at an FF corner case, values described in a lookup table are derived based on the FF corner case and therefore the values are used for decreasing the operation speed of a cell.

In operation 106, the first path is identified as a target path. In an embodiment, when values in a lookup table are derived based on an SS corner case, a hold time check and a setup time check are performed.

In operation 108, first values are derived and output from the lookup table by indexing the lookup table with a threshold voltage associated with the first path identified as the target path as the main threshold voltage and a threshold voltage associated with the second path as the slave threshold voltage. In further detail, first values include a first value and a second value. The first value is retrieved and output by indexing the lookup table with the first threshold voltage as the main threshold voltage and the third threshold voltage as the slave threshold voltage. Moreover, a second value is retrieved and output by indexing the lookup table with the second threshold voltage as the main threshold voltage and the third threshold voltage as the slave threshold voltage.

In operation 110, a first extra time is calculated based on the first values and first cell delays associated with the first path. In an embodiment, the first cell delays are described in a timing library. In further detail, the first extra time is calculated based on the first value, the first cell delay, the second value and the second cell delay. In an embodiment, when a hold time check is performed and the corner case is an SS corner case, a hold time of the present disclosure is more critical than a setup time obtained under SS corner case by the first extra time.

In operation 112, the second path is identified as the target path. In an embodiment, when values in a lookup table are derived based on an SS corner case, a hold time check and a setup time check are performed.

In operation 114, second values are derived and output from the lookup table by indexing the lookup table with a threshold voltage associated with the second path identified as the target path as the main threshold voltage and a threshold voltage associated with the first path as the slave threshold voltage.

In operation 116, a second extra time is calculated based on the second values and second cell delays associated with the second path. The second cell delays are described in the timing library.

As semiconductor manufacturing technology continues to develop, on-chip variation becomes relatively significant. For example, a die of a digital circuit may include cells having three different threshold voltages. Operation speed of the cells having the three different threshold voltages may be subject to different variations. For example, the operation speed of a first cell, which has a first threshold voltage, may be kept at an SS corner case while the operation speed of a second cell, which has a second threshold voltage different from the first threshold voltage, may be faster than the SS corner case. Such scenarios have been taken into consideration in the present disclosure and therefore a simulation result can cover relatively broad circumstances. Contrarily, in some existing approaches, in timing analysis, a same corner case, such as an SS corner case, is set for all the cells regardless of their threshold voltages. Consequently, the existing approaches can only cover relatively narrow circumstances, and therefore may be relatively optimistic.

Figure 7:
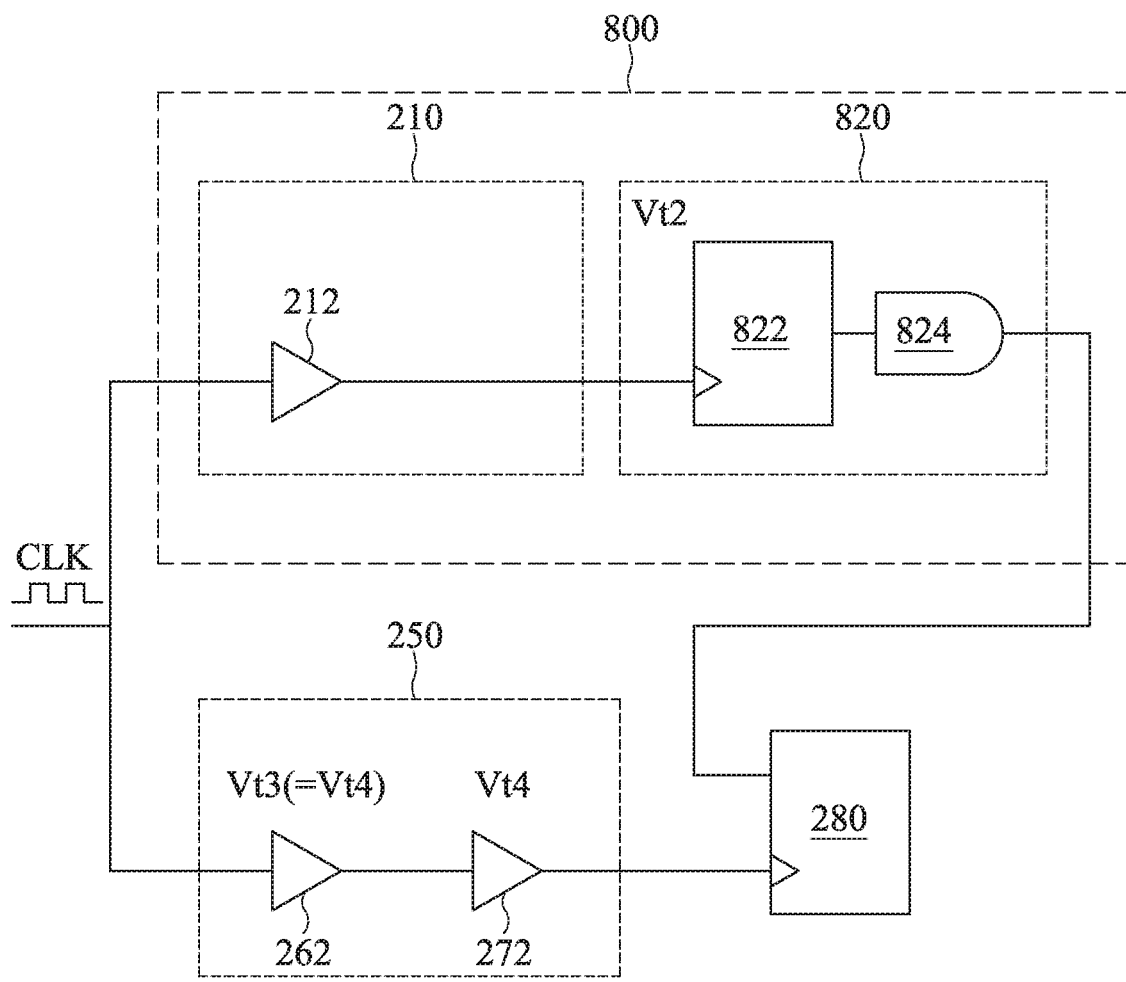
FIG. 7 is a circuit diagram of a digital circuit described in a netlist, in accordance with some embodiments of the present disclosure.

FIG. 7 is a circuit diagram of a digital circuit 80 described in a netlist, in accordance with some embodiments of the present disclosure. Referring to FIG. 8, the digital circuit 80 is similar to the digital circuit 20 described and illustrated with reference to FIG. 1 except that, for example, the digital circuit 80 includes a first path 800 including a data path 820. The data path 820 includes a first gate 822 and a combinational logic 824. As mentioned in the embodiment of FIG. 1, for the convenience of discussion, in the following context, the first gate 822 is deemed as a second cell, the second cell is labeled as 822, and the combinational logic 824 will be ignored. The second cell 822 has a second threshold voltage Vt2 not equal to the first threshold voltage Vt1.

FIG. 8 is a diagram of a lookup table 85 in accordance with some embodiments of the present disclosure. Referring to FIG. 8, the lookup table 85 is similar to the lookup table 30 described and illustrated with reference to FIG. 3 except that, for example, the lookup table 85 further includes the second threshold voltage Vt2. The lookup table 85 can be used in substantially the same fashion as that in FIG. 3. Therefore, detailed descriptions are omitted herein. In operation, a value VA2 is retrieved and output by indexing the lookup table 85 with the second threshold voltage Vt2 as the main threshold voltage and the first threshold voltage Vt1 as the slave threshold voltage. In an embodiment, the value VA2 is about 4%. Moreover, a value VA20 is retrieved and output by indexing the lookup table 85 with the second threshold voltage Vt2 as the main threshold voltage and the third threshold voltage Vt3 as the slave threshold voltage. In an embodiment, the value VA20 is about 4%.

Figure 9:
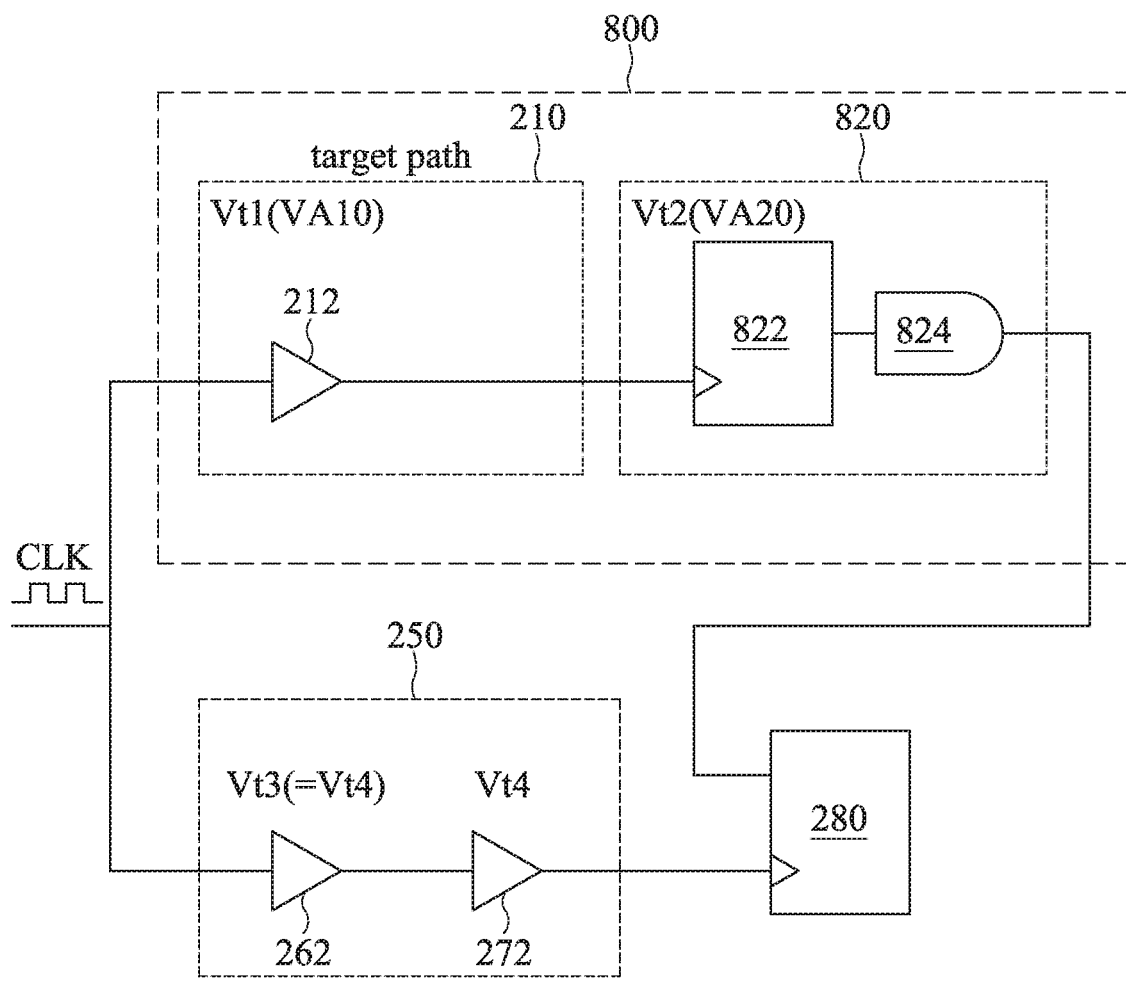
FIG. 9 is a diagram illustrating timing analysis on the digital circuit shown in FIG. 7, in accordance with some embodiments of the present disclosure.

FIG. 9 is a diagram illustrating a timing analysis on the digital circuit 80 shown in FIG. 7, in accordance with some embodiments of the present disclosure. Referring to FIG. 9, the first path 800 is identified as the target path. As a result, operation speeds of the first cell 212 and the second cell 822 in the first path 800 are adjusted. The value VA10 is retrieved and output by indexing the lookup table 85 with the first threshold voltage Vt1 of the first cell 212 as the main threshold voltage and the third threshold voltage Vt3 of the third cell 262 (, or the fourth cell 272) as the slave threshold voltage. Also, the value VA20 is retrieved and output by indexing the lookup table 85 with the second threshold voltage Vt2 of the second cell 822 as the main threshold voltage and the third threshold voltage Vt3 of the third cell 262 (, or the fourth cell 272) as the slave threshold voltage.

A first extra time is calculated based on the value VA10, a first cell delay associated with the first cell 212, the value VA20 and a second cell delay associated with the second cell 822. In further detail, a first sub extra time is calculated based on the value VA10 and the first cell delay. A second sub extra time is calculated based on the value VA20 and the second cell delay. The first extra time is calculated by summing the first sub extra time and the second sub extra time. In an embodiment, the first cell delay is about 100 ps, the second cell delay is about 50 ps, the value VA10 is 8% and the value VA20 is 6%. The first extra time can be obtained as follows.

The first extra time=100 ps×8%+50 ps×6%=11 ps.

In a circumstance that a timing analysis is performed at an SS corner case for both the first path 800 and the second path 250, an original delay time of the first path 800 is obtained by summing the first cell delay of 50 ps and the second cell delay of 100 ps, and is therefore 150 ps. By using the approach of the present disclosure, an equivalent delay time of the first path 800 is obtained by subtracting the first extra time of 11 ps from the original delay time of 150 ps, and is therefore 139 ps.

Figure 10:
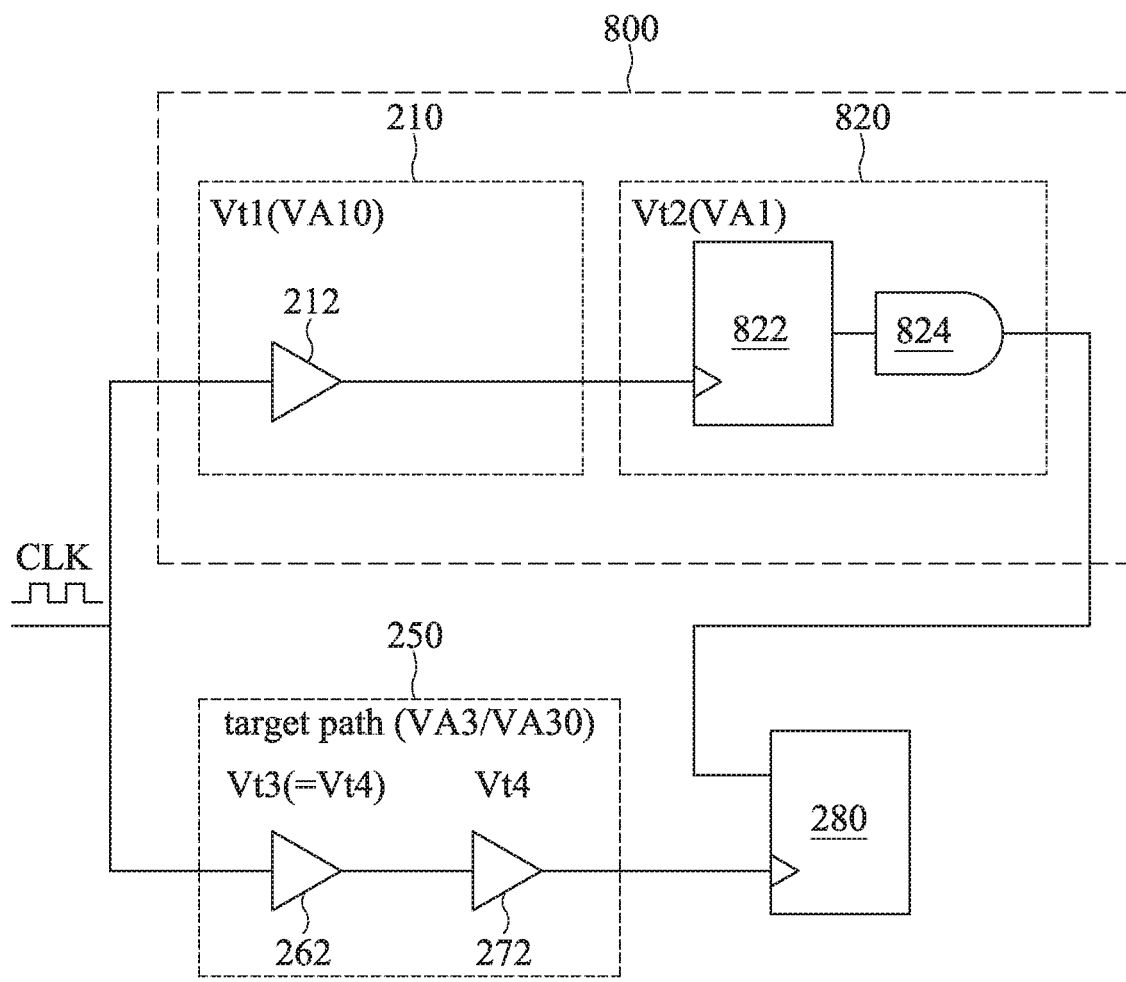
FIG. 10 is a diagram illustrating timing analysis on the digital circuit shown in FIG. 7, in accordance with some embodiments of the present disclosure.

FIG. 10 is a diagram illustrating a timing analysis on the digital circuit 80 shown in FIG. 7, in accordance with some embodiments of the present disclosure. Referring to FIG. 10, the second path 250 is identified as the target path. As a result, operation speeds of the third cell 262 and the fourth cell 272 in the second path 250 are adjusted. The value VA3 is retrieved and output by indexing the lookup table 85 with the third threshold voltage Vt3 of the third cell 262 as the main threshold voltage and the first threshold voltage Vt1 of the first cell 212 as the slave threshold voltage. Also, the value VA30 is retrieved and output by indexing the lookup table 85 with the third threshold voltage Vt3 of the third cell 262 as the main threshold voltage and the second threshold voltage Vt2 of the second cell 822 as the slave threshold voltage. One of the values VA3 and VA30 is selected for calculating the second extra time. In an embodiment, the greater one of the values VA3 and VA30 is selected for calculating the second extra time. In summary, in an embodiment, the second extra time is calculated based on a greater one of the values VA3 and VA30, the third cell delay and the fourth cell delay.

In an embodiment, the third cell delay is about 100 ps, the fourth cell delay is about 50 ps, the value VA3 is 7% and the value VA30 is 8%. The second extra time can be obtained as follows.

The second extra time=100 ps×7%+50 ps×8%=11 ps.

In a circumstance that a timing analysis is performed at an SS corner case for both the first path 800 and the second path 250, an original delay time of the second path 250 is obtained by summing the third cell delay of 50 ps and the fourth cell delay of 100 ps, and is therefore 150 ps. By using the approach of the present disclosure, an equivalent delay time of the second path 250 is obtained by subtracting the second extra time of 11 ps from the original delay time of 150 ps, and is therefore 139 ps.

FIG. 11 is a flow diagram of another method 70 of a timing analysis, in accordance with some embodiments of the present disclosure. The method 70 is similar to the method 10 described and illustrated with reference to FIG. 6 except that, for example, the method 70 includes operations 700, 702, 704, 706, 708 and 710. In operation 700, a netlist of a digital circuit describing a timing path is prepared. The timing path includes a first path and a second path, which are controlled by a same clock signal while do not overlap with each other. The first path includes a launch clock path and a data path, and the second path includes a capture clock path. The first path includes a first cell having a first threshold voltage, and a second cell having a second threshold voltage different from the first threshold voltage. The second path includes a third cell having a third threshold voltage, and a fourth cell having the third threshold voltage different from the first threshold voltage and the second threshold voltage. In operation 702, a first value is retrieved and output by indexing the lookup table with the first threshold voltage as the main threshold voltage and the third threshold voltage as the slave threshold voltage. In operation 704, a second value is retrieved and output by indexing the lookup table with the second threshold voltage as the main threshold voltage and the third threshold voltage as the slave threshold voltage. In operation 706, a first extra time is calculated based on the first value, the first cell delay, the second value and the second cell delay. In operation 708, a third value is retrieved and output by indexing the lookup table with the third threshold voltage as the main threshold voltage and one of the first threshold voltage and the second threshold voltage as the slave threshold. In operation 710, a second extra time is calculated based on the third value, the third cell delay and the fourth cell delay.

With the method of the present disclosure, even though a path, such as the first path 800 of the present disclosure, includes components having two different threshold voltages, the simulation result is able to cover relatively broad circumstances.

Figure 12:
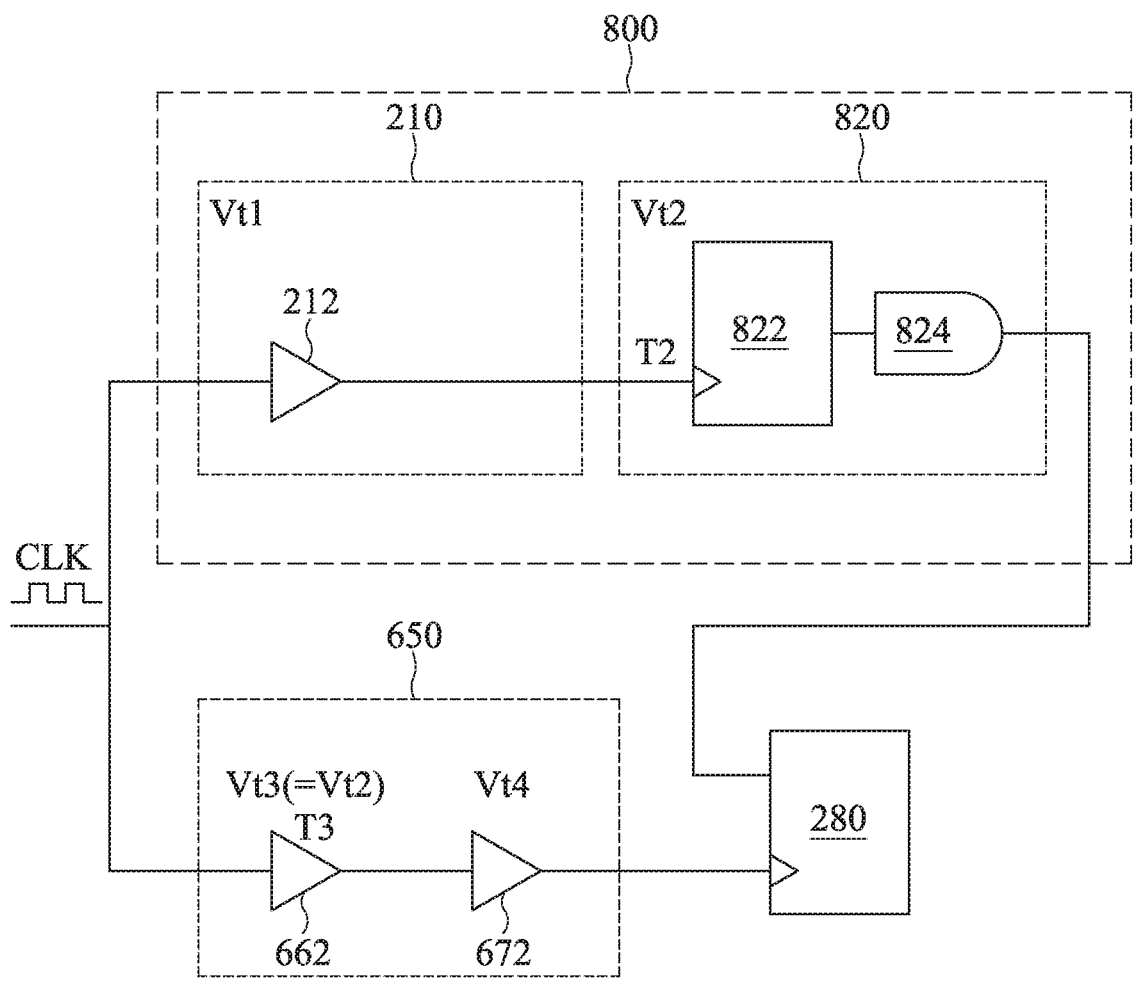
FIG. 12 is a diagram illustrating timing analysis on a digital circuit, in accordance with some embodiments of the present disclosure.

FIG. 12 is a diagram illustrating a timing analysis on a digital circuit 60, in accordance with some embodiments of the present disclosure. Referring to FIG. 12, the digital circuit 60 is similar to the digital circuit 80 described and illustrated with reference to FIG. 7 except that, for example, the digital circuit 60 includes a second path 650 including a third cell 662 and a fourth cell 672. The third cell 662 has a third threshold voltage Vt3 equal to the second threshold voltage Vt2 of the second cell 822. The fourth cell 672 has a fourth threshold voltage Vt4 different from the second threshold voltage Vt2 of the second cell 822. Moreover, the second cell 822 has a second cell delay T2, and the third cell 662 has a third cell delay T3.

Figure 13:
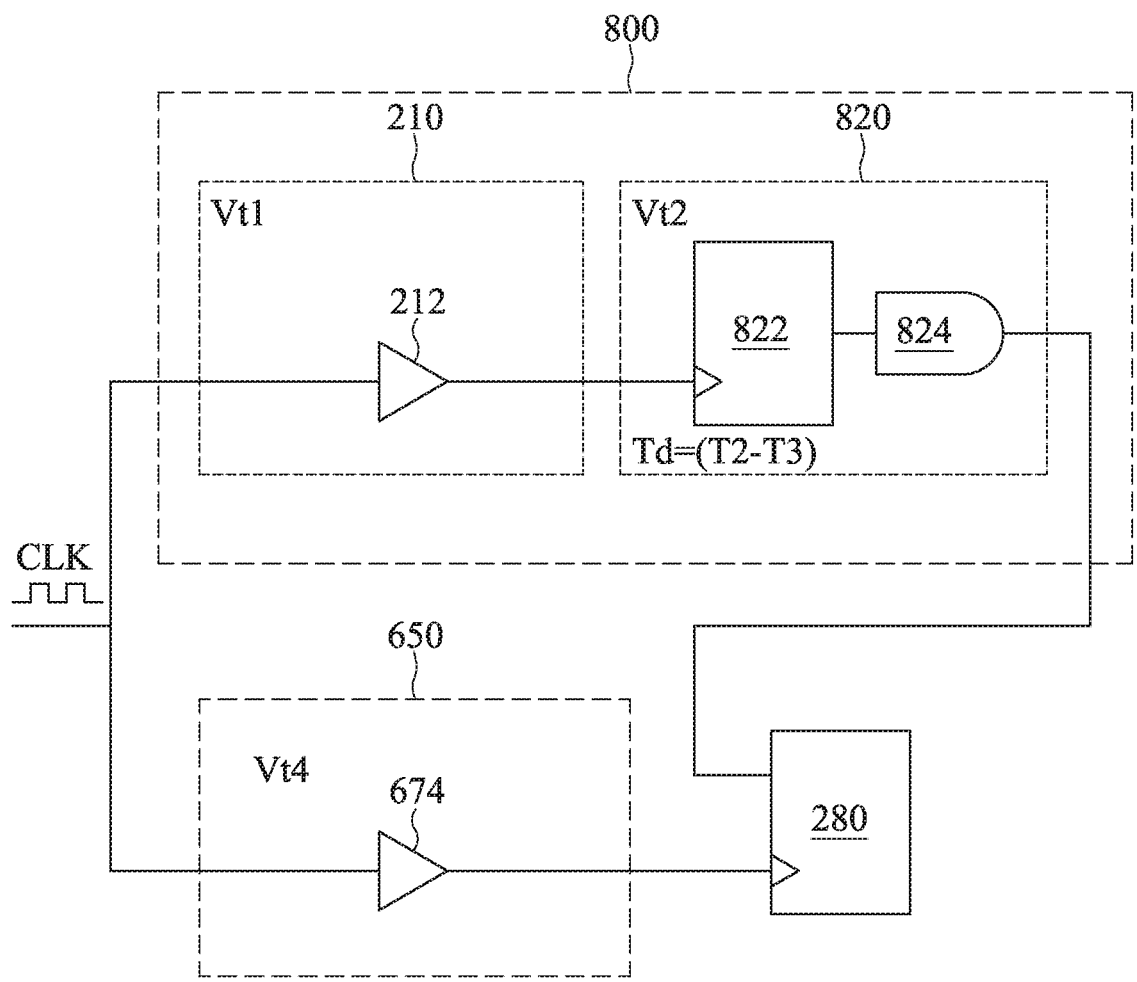
FIG. 13 is a circuit diagram of an equivalent circuit of the digital circuit shown in FIG. 12, in accordance with some embodiments of the present disclosure.

FIG. 13 is a circuit diagram of an equivalent circuit of the digital circuit 60 shown in FIG. 12, in accordance with some embodiments of the present disclosure. Referring to FIG. 13, the second cell delay T2 is replaced with a resultant cell delay Td by counter cancelling the second cell delay T2 with the third cell delay T3. After counter cancelling, an equivalent circuit is shown in FIG. 13. Such equivalent circuit is similar to the digital circuit 80 described and illustrated with reference to FIG. 7. Therefore, by using the same manner, the first extra time and the second extra time can be obtained.

Figure 14:
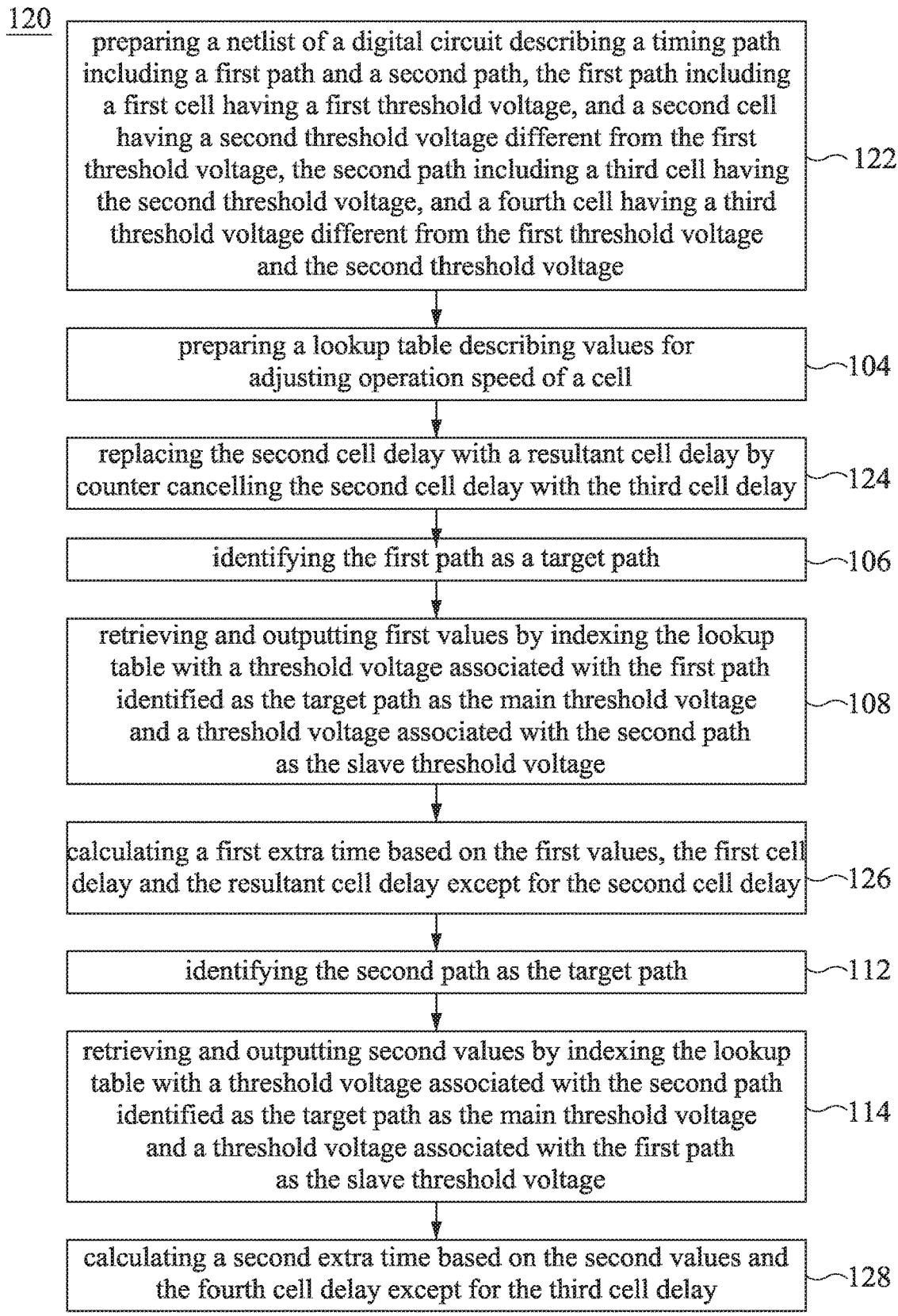
FIG. 14 is a flow diagram of further another method of timing analysis, in accordance with some embodiments of the present disclosure.

FIG. 14 is a flow diagram of further another method 120 of a timing analysis, in accordance with some embodiments of the present disclosure. Referring to FIG. 14, the method 120 is similar to the method 10 described and illustrated with reference to FIG. 6 except that, for example, the method 120 includes operations 122, 124, 126 and 128.

In operation 122, a netlist of a digital circuit describing a timing path is prepared. The timing path includes a first path and a second path, which are controlled by a same clock signal while do not overlap with each other. The first path includes a launch clock path and a data path, and the second path includes a capture clock path. The first path includes a first cell having a first threshold voltage, and a second cell having a second threshold voltage different from the first threshold voltage. The second path includes a third cell having the second threshold voltage, and a fourth cell having a third threshold voltage different from both the first threshold voltage and the second threshold voltage.

In operation 124, the second cell delay is replaced with a resultant cell delay by counter cancelling the second cell delay with the third cell delay. In operation 126, a first extra time is calculated based on the first values, the first cell delay and the resultant cell delay except for the second cell delay. In operation 128, a second extra time is calculated based on the second values and the fourth cell delay except for the third cell delay.

FIG. 15 is a diagram of a lookup table 150, in accordance with some embodiments of the present disclosure. Referring to FIG. 15, the lookup table 150 lists seven combinations numbered 1 through 7. For the combination 2, for example, it is assumed that a value of VC1 is about 6%, a first cell delay associated with the first cell 212 is about 100 ps, a second cell delay associated with the second cell 822 is about 50 ps, a third cell delay associated with the third cell 662 is about 30 ps and a fourth cell delay associated with the fourth cell 672 is about 150 ps. As such, based on the digital circuit 60 shown in FIG. 12, the extra time associated with the combination 2 can be obtained as follows.

extra time=(100 ps×6%+50 ps×0%)−(30 ps×0%+150×0%)=6 ps.

Similarly, all the extra times of the other combinations can be calculated. Afterwards, a maximum extra time and a minimum extra time from the extra times calculated are selected as a first extra time and a second extra time as an extra margin for setup check and hold check. In a case that a timing analysis is performed based on an SS corner case, the maximum extra time serves as a first extra time. Function of the first extra time is the same as that previously discussed. Moreover, the minimum extra time serves as a second extra time. Function of the second extra time is the same as that previously discussed.

FIG. 16 is a flow diagram of still another method 90 of timing analysis, in accordance with some embodiments of the present disclosure. Referring to FIG. 16, the method 90 is similar to the method 120 described and illustrated with reference to FIG. 14 except that, for example, the method 90 includes operations 900, 902, and 904.

In operation 900, a lookup table is prepared. Values provided in the lookup table is derived based on a corner case at which a timing analysis is performed. The lookup table describes a plurality of combinations. Each of the combinations provides a first value for adjusting an operation speed of a cell having the first threshold voltage, a second value for adjusting an operation speed of a cell having the second threshold voltage and a third value for adjusting an operation speed of a cell having the third threshold voltage. One of the first value, the second value and the third value is zero. Additionally, each of the combination is different from others.

In operation 902, a plurality of extra time for the combinations is calculated. For each of the combinations each of the extra times is calculated based on the first cell delay, the first value, the second cell delay, the second value, the third cell delay, the third value and the fourth cell delay. In operation 904, a maximum extra time and a minimum extra time from the extra times are selected as a first extra time and a second extra time.

Figure 17:
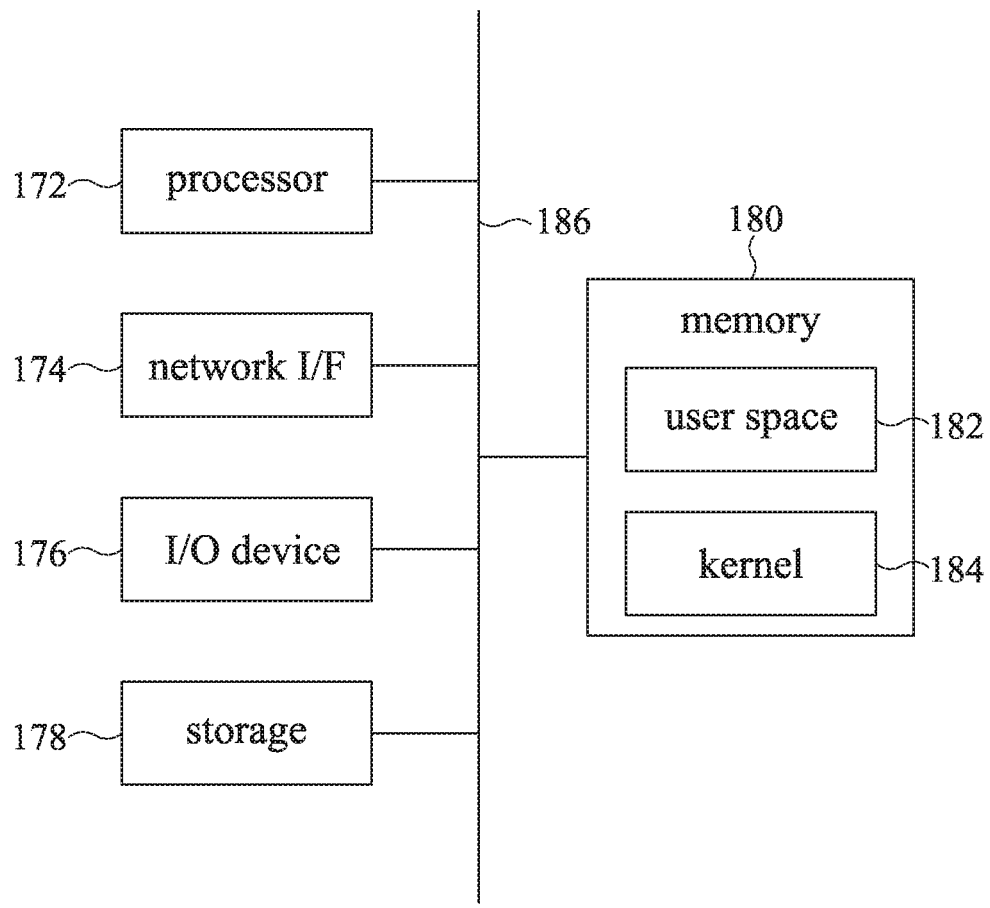
FIG. 17 is a block diagram of a system for implementing method embodiments described with reference to FIGS. 1-16 in accordance with some embodiments.

FIG. 17 is a block diagram of a system 170 for implementing method embodiments described with reference to FIGS. 1-16 in accordance with some embodiments. The system 170 includes at least one processor 172, a network interface 174, an input and output (I/O) device 176, a storage 178, a memory 180, and a bus 186. The bus 186 couples the network interface 174, the I/O device 176, the storage 178 and the memory 180 to the processor 172.

In some embodiments, the memory 180 comprises a random access memory (RAM) and/or other volatile storage device and/or read only memory (ROM) and/or other non-volatile storage device. The memory 180 includes a kernel 184 and user space 182, configured to store program instructions to be executed by the processor 172 and data accessed by the program instructions.

In some embodiments, the network interface 174 is configured to access program instructions and data accessed by the program instructions stored remotely through a network. The I/O device 176 includes an input device and an output device configured for enabling user interaction with the system 170. The input device comprises, for example, a keyboard, a mouse, etc. The output device comprises, for example, a display, a printer, etc. The storage device 178 is configured for storing program instructions and data accessed by the program instructions. The storage device 178 comprises, for example, a magnetic disk and an optical disk.

In some embodiments, when executing the program instructions, the processor 172 is configured as the software system or configured to perform methods described with reference to FIGS. 1-16.

In some embodiments, the program instructions are stored in a non-transitory computer readable recording medium such as one or more optical disks, hard disks and non-volatile memory devices.

In some embodiments, a method includes preparing a netlist of a digital circuit describing a timing path, wherein the timing path includes a first path and a second path, which are controlled by a same clock signal while do not overlap with each other. The first path includes a launch clock path and a data path, and the second path includes a capture clock path. The first path includes a first cell having a first threshold voltage, and a second cell having a second threshold voltage. The second path includes a third cell and a fourth cell. The method further includes preparing a timing library. The timing library describes a first cell delay associated with the first cell, a second cell delay associated with the second cell, a third cell delay associated with the third cell and a fourth cell delay associated with the fourth cell. The method further includes preparing a lookup table. The lookup table provides values for adjusting operation speed of a cell. The values are derived based on a corner case at which a timing analysis is performed. The method further includes performing a simulation based on the netlist, the timing library, and the lookup table. The simulation includes identifying the first path as a target path, wherein an operation speed of the target path is adjusted from the corner case. The simulation further includes deriving and outputting first values from the lookup table by indexing the lookup table with a threshold voltage associated with the first path identified as the target path as the main threshold voltage and a threshold voltage associated with the second path as the slave threshold voltage. The simulation further includes calculating a first extra time based on the first values and first cell delays associated with the first path. The simulation further includes identifying the second path as the target path. The simulation further includes deriving and outputting second values from the lookup table by indexing the lookup table with a threshold voltage associated with the second path identified as the target path as the main threshold voltage and a threshold voltage associated with the first path as the slave threshold voltage. The simulation further includes calculating a second extra time based on the second values and second cell delays associated with the second path.

In some embodiments, a method includes preparing a netlist of a digital circuit describing a timing path, wherein the timing path includes a first path and a second path, which are controlled by a same clock signal while do not overlap with each other. The first path includes a launch clock path and a data path, and the second path includes a capture clock path. The first path includes a first cell having a first threshold voltage, and a second cell having a second threshold voltage different from the first threshold voltage. The second path includes a third cell having the second threshold voltage, and a fourth cell having a third threshold voltage different from the first threshold voltage and the second threshold voltage. The method further includes preparing a timing library describing a first cell delay associated with the first cell, a second cell delay associated with the second cell, a third cell delay associated with the third cell and a fourth cell delay associated with the fourth cell. The method further includes preparing a lookup table providing values for adjusting operation speed of a cell. The values are derived based on a corner case at which a timing analysis is performed. The method further includes performing a simulation based on the netlist, the timing library, and the lookup table. The simulation includes replacing the second cell delay with a resultant cell delay by counter cancelling the second cell delay with the third cell delay. The simulation further includes identifying the first path as a target path, wherein an operation speed of the target path is adjusted from the corner case. The simulation further includes retrieving and outputting first values by indexing the lookup table with a threshold voltage associated with the first path identified as the target path as the main threshold voltage and a threshold voltage associated with the second path as the slave threshold voltage. The simulation further includes calculating a first extra time based on the first values, the first cell delay and the resultant cell delay except for the second cell delay. The simulation further includes identifying the second path as the target path. The simulation further includes retrieving and outputting second values by indexing the lookup table with a threshold voltage associated with the second path identified as the target path as the main threshold voltage and a threshold voltage associated with the first path as the slave threshold voltage. The simulation further includes calculating a second extra time based on the second values and the fourth cell delay except for the third cell delay.

In some embodiments, the method includes preparing a netlist of a digital circuit describing a timing path, wherein the timing path includes a first path and a second path, which are controlled by a same clock signal while do not overlap with each other. The first path includes a launch clock path and a data path, and the second path includes a capture clock path. The first path includes a first cell having a first threshold voltage, and a second cell having a second threshold voltage different from the first threshold voltage. The second path includes a third cell having the second threshold voltage, and a fourth cell having a third threshold voltage. The method further includes preparing a timing library describing a first cell delay associated with the first cell, a second cell delay associated with the second cell, a third cell delay associated with the third cell and a fourth cell delay associated with the fourth cell. The method further includes preparing a lookup table. Values described in the lookup table are derived based on a corner case at which a timing analysis is performed. The lookup table includes a plurality of combinations. Each combinations describes a first value for adjusting an operation speed of a cell having the first threshold voltage, a second value for adjusting an operation speed of a cell having the second threshold voltage and a third value for adjusting an operation speed of a cell having the third threshold voltage. One of the first value, the second value and the third value is zero. Each of the combination is different from each other. The method further includes performing a simulation based on the netlist, the timing library, and the lookup table. The simulation includes calculating a plurality of extra time for the combinations. For each of the combinations each of the extra times is calculated based on the first cell delay, the first value, the second cell delay, the second value, the third cell delay, the third value. The simulation further includes selecting a maximum extra time and a minimum extra time from the extra times as an extra margin for setup check and hold check.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
preparing a netlist of a digital circuit describing a timing path, wherein the timing path includes a first path and a second path, which are controlled by a same clock signal while do not overlap with each other, wherein the first path includes a launch clock path and a data path, and the second path includes a capture clock path, wherein the first path includes a first cell having a first threshold voltage, and a second cell having a second threshold voltage, wherein the second path includes a third cell and a fourth cell,
preparing a timing library describing a first cell delay associated with the first cell, a second cell delay associated with the second cell, a third cell delay associated with the third cell and a fourth cell delay associated with the fourth cell;
preparing a lookup table providing values for adjusting operation speed of a cell, the values being derived based on a corner case at which a timing analysis is performed; and
performing a simulation based on the netlist, the timing library, and the lookup table, the simulation including:
identifying the first path as a target path, wherein an operation speed of the target path is adjusted from the corner case;
deriving and outputting first values from the lookup table by indexing the lookup table with a threshold voltage associated with the first path identified as the target path as a main threshold voltage and a threshold voltage associated with the second path as a slave threshold voltage;
calculating a first extra time based on the first values and a first delay associated with the first path;
identifying the second path as the target path;
deriving and outputting second values from the lookup table by indexing the lookup table with a threshold voltage associated with the second path identified as the target path as the main threshold voltage and a threshold voltage associated with the first path as the slave threshold voltage; and
calculating a second extra time based on the second values and a second delay associated with the second path.

2. The method of claim 1,
wherein the deriving and outputting the first values from the lookup table by indexing the lookup table with the threshold voltage associated with the first path identified as the target path as the main threshold voltage and the threshold voltage associated with the second path as the slave threshold voltage includes:
deriving and outputting a first value and a second value by indexing the lookup table, respectively, with the first threshold voltage as the main threshold voltage and the third threshold voltage as the slave threshold voltage and with the second threshold voltage as the main threshold voltage and the third threshold voltage as the slave threshold voltage, and
wherein the calculating the first extra time based on the first values and the first delay associated with the first path includes:
calculating the first extra time based on the first value, the first cell delay, the second value and the second cell delay.

3. The method of claim 1, wherein the first threshold voltage is the same as the second threshold voltage.

4. The method of claim 3, wherein the third threshold voltage is different from the first threshold voltage.

5. The method of claim 2, wherein the data path includes a first gate configured to launch data, and a combinational logic configured to transfer the data, and the digital circuit includes a second gate configured to capture the data transferred by the combinational logic.

6. The method of claim 2, wherein when the corner case is an SS corner case, a hold time obtained by the method is more critical than the SS corner case by the first extra time.

7. The method of claim 2,
wherein the identifying the first path as the target path includes:
identifying the first path as the target path when a hold time check is performed, and
wherein the identifying the second path as the target path includes:
identifying the second path as the target path when a setup time check is performed.

8. The method of claim 1, wherein function of the third cell is the same as that of the fourth cell.

9. The method of claim 2, wherein the third cell has a third threshold voltage, and the fourth cell has a fourth threshold voltage same as the third threshold voltage while different from the second threshold voltage and the first threshold voltage, and the second threshold voltage being different from the first threshold voltage.

10. The method of claim 9,
wherein the calculating the first extra time based on the first value, the first cell delay, the second value and the second cell delay includes:
calculating a first sub extra time based on the first value and the first cell delay;
calculating a second sub extra time based on the second value and the second cell delay; and
calculating the first extra time by summing the first sub extra time and the second sub extra time.

11. The method of claim 9,
wherein the deriving and outputting the second values from the lookup table by indexing the lookup table with the threshold voltage associated with the second path identified as the target path as the main threshold voltage and the threshold voltage associated with the first path as the slave threshold voltage includes:
retrieving and outputting a third value and a fourth value by indexing the lookup table, respectively, with the third threshold voltage as the main threshold voltage and the first threshold voltage as the slave threshold voltage and with the third threshold voltage as the main threshold voltage and the second threshold voltage as the slave threshold voltage, and
wherein the calculating the second extra time based on the second values and the second delay associated with the second path includes:
calculating a second extra time based on one of the third value and the fourth value, the third cell delay and the fourth cell delay.

12. The method of claim 11, wherein the calculating the second extra time based on one of the third value and the fourth value, the third cell delay and the fourth cell delay includes:
calculating the second extra time based on a greater one of the third value and the fourth value, the third cell delay and the fourth cell delay.

13. A method, comprising:
preparing a netlist of a digital circuit describing a timing path, wherein the timing path includes a first path and a second path, which are controlled by a same clock signal while do not overlap with each other, wherein the first path includes a launch clock path and a data path, and the second path includes a capture clock path, wherein the first path includes a first cell having a first threshold voltage, and a second cell having a second threshold voltage different from the first threshold voltage, wherein the second path includes a third cell having the second threshold voltage, and a fourth cell having a third threshold voltage different from the first threshold voltage and the second threshold voltage;
preparing a timing library describing a first cell delay associated with the first cell, a second cell delay associated with the second cell, a third cell delay associated with the third cell and a fourth cell delay associated with the fourth cell;
preparing a lookup table providing values for adjusting operation speed of a cell, the values being derived based on a corner case at which a timing analysis is performed; and
performing a simulation based on the netlist, the timing library, and the lookup table, the simulation including:
replacing the second cell delay with a resultant cell delay by counter cancelling the second cell delay with the third cell delay;
identifying the first path as a target path, wherein an operation speed of the target path is adjusted from the corner case;
retrieving and outputting first values by indexing the lookup table with a threshold voltage associated with the first path identified as the target path as a main threshold voltage and a threshold voltage associated with the second path as a slave threshold voltage;
calculating a first extra time based on the first values, the first cell delay and the resultant cell delay except for the second cell delay;
identifying the second path as the target path;
retrieving and outputting second values by indexing the lookup table with a threshold voltage associated with the second path identified as the target path as the main threshold voltage and a threshold voltage associated with the first path as the slave threshold voltage; and
calculating a second extra time based on the second values and the fourth cell delay except for the third cell delay.

14. The method of claim 13,
wherein the retrieving and outputting the first values by indexing the lookup table with the threshold voltage associated with the first path identified as the target path as the main threshold voltage and the threshold voltage associated with the second path as the slave threshold voltage includes:
retrieving and outputting a first value and a second value by indexing the lookup table, respectively, with the first threshold voltage as the main threshold voltage and the third threshold voltage as the slave threshold voltage and with the second threshold voltage as the main threshold voltage and the third threshold voltage as the slave threshold voltage,
wherein the calculating the first extra time based on the first values, the first cell delay and the resultant cell delay except for the second cell delay includes:
calculating the first extra time based on the first value, the first cell delay, the second value and the resultant cell delay.

15. The method of claim 14,
wherein the retrieving and outputting the second values by indexing the lookup table with the threshold voltage associated with the second path identified as the target path as the main threshold voltage and the threshold voltage associated with the first path as the slave threshold voltage includes:
retrieving and outputting a third value and a fourth value by indexing the lookup table, respectively, with the third threshold voltage as the main threshold voltage and the first threshold voltage as the slave threshold voltage and with the third threshold voltage as the main threshold voltage and the second threshold voltage as the slave threshold voltage,
wherein the calculating the second extra time based on the second values and the fourth cell delay except for the third cell delay includes:
calculating a second extra time based on one of the third value and the fourth value, and the fourth cell delay.

16. The method of claim 15, wherein the calculating the second extra time based on one of the third value and the fourth value, and the fourth cell delay includes:
calculating the second extra time based on the greater one of the third value and the fourth value, and the fourth cell delay.

17. The method of claim 13, wherein the data path includes a first gate configured to launch data, and a combinational logic configured to transfer the data, and the digital circuit includes a second gate configured to capture the data transferred by the combinational logic.

18. A method, comprising:
preparing a netlist of a digital circuit describing a timing path, wherein the timing path includes a first path and a second path, which are controlled by a same clock signal while do not overlap with each other, wherein the first path includes a launch clock path and a data path, and the second path includes a capture clock path, wherein the first path includes a first cell having a first threshold voltage, and a second cell having a second threshold voltage different from the first threshold voltage, wherein the second path includes a third cell having the second threshold voltage, and a fourth cell having a third threshold voltage;

preparing a timing library describing a first cell delay associated with the first cell, a second cell delay associated with the second cell, a third cell delay associated with the third cell and a fourth cell delay associated with the fourth cell;

preparing a lookup table, values described in the lookup table being derived based on a corner case at which a timing analysis is performed, the lookup table including a plurality of combinations, each combination describes a first value for adjusting an operation speed of a cell having the first threshold voltage, a second value for adjusting an operation speed of a cell having the second threshold voltage and a third value for adjusting an operation speed of a cell having the third threshold voltage, wherein one of the first value, the second value and the third value is zero, and wherein each of the combinations is different from each other; and performing a simulation based on the netlist, the timing library, and the lookup table, the simulation including:

calculating a plurality of extra times for the combinations, wherein for each of the combinations each of the extra times is calculated based on the first cell delay, the first value, the second cell delay, the second value, the third cell delay, the third value;

selecting a maximum extra time from the calculated extra times, wherein when the maximum extra time is a positive value, the maximum extra time serves as an extra margin for hold time check; and selecting a minimum extra time from the calculated extra times, wherein when the minimum extra time is a negative value, an absolute value of the minimum extra time serves as an extra margin for setup time check.

19. The method of claim 18, wherein when the corner case is an SS corner case, a setup time obtained by the method is critical than a setup time obtained under the SS corner case by the maximum extra time.

20. The method of claim 18, wherein the data path includes a first gate configured to launch data, and a combinational logic configured to transfer the data, and the digital circuit includes a second gate configured to capture the data transferred by the combinational logic.

* * * * *